United States Patent
Ball et al.

(10) Patent No.: US 10,746,323 B2
(45) Date of Patent: Aug. 18, 2020

(54) PIPE SUPPORT AND METHOD

(71) Applicant: WCM Industries, Inc., Colorado Springs, CO (US)

(72) Inventors: William T. Ball, Colorado Springs, CO (US); Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 16/191,215

(22) Filed: Nov. 14, 2018

(65) Prior Publication Data

US 2019/0145548 A1  May 16, 2019

Related U.S. Application Data (60) Provisional application No. 62/587,293, filed on Nov. 16, 2017.

(51) Int. Cl.
| | | |
|---|---|---|
| *F16L 3/08* | (2006.01) | |
| *F16L 3/10* | (2006.01) | |
| *F16L 3/18* | (2006.01) | |
| *F16L 51/00* | (2006.01) | |

(52) U.S. Cl.
CPC ........... *F16L 3/1033* (2013.01); *F16L 3/1041* (2013.01); *F16L 3/18* (2013.01); *F16L 51/00* (2013.01)

(58) Field of Classification Search
CPC ......... F16L 3/1041; F16L 3/1008; F16L 2/02; F16L 3/1207
See application file for complete search history.

(56) References Cited

U.S. PATENT DOCUMENTS

| | | | |
|---|---|---|---|
| 1,343,279 A | | 6/1920 | Reynolds |
| 2,103,811 A | | 12/1937 | Davis |
| 2,384,369 A | * | 9/1945 | D Alelio .............. C08G 12/28 528/248 |
| 2,461,394 A | * | 2/1949 | Plante ..................... B66C 1/48 294/102.1 |
| 3,398,933 A | | 8/1968 | Haroldson |
| 3,809,348 A | | 5/1974 | Di Laura |
| 4,445,656 A | | 5/1984 | Leitch |
| 4,502,653 A | | 3/1985 | Curtis, Jr. |
| 5,110,073 A | | 5/1992 | Schoenky |
| 5,435,411 A | | 7/1995 | Borgatti |
| 5,906,341 A | | 5/1999 | Brown |
| 6,206,613 B1 | | 3/2001 | Elkins |
| 6,405,981 B1 | | 6/2002 | Hung-Jang |
| 7,621,486 B1 | | 11/2009 | Barrepski |
| 7,673,917 B2 | * | 3/2010 | Oliason ................. B66C 1/422 294/110.1 |
| 8,033,024 B2 | * | 10/2011 | Goop .................... B23D 21/04 30/101 |
| 8,052,110 B2 | | 11/2011 | Wang |

(Continued)

OTHER PUBLICATIONS

Roof Top Blox, "Adjustable Piping Support" Catalog, Sep. 2013, 2 pgs.

(Continued)

*Primary Examiner* — Amy J. Sterling (57) ABSTRACT

A pipe support has a pair of arms. The first end of one arm has a tongue and the first end of the other arm has an elongate groove configured to slidably receive the tongue. Base plates are pivotably connected to the second ends of both arms.

18 Claims, 12 Drawing Sheets

(56) References Cited

U.S. PATENT DOCUMENTS

| | | | |
|---|---|---|---|
| 8,348,317 B1 * | 1/2013 | Bird | A45F 5/00 248/75 |
| 2002/0011548 A1 | 1/2002 | Parker | |
| 2013/0214101 A1 | 8/2013 | Daniel | |
| 2016/0131280 A1 | 5/2016 | Brown | |
| 2019/0145547 A1 | 5/2019 | Ball | |

OTHER PUBLICATIONS

Pipe Prop, "Adjustable Rooftop Pipe Support System" Brochure, Oct. 2017, 2 pgs.

Miro Industries, Inc., "Rooftop Support Products", www.miroind.com/products/, downloaded Aug. 2019, known as of Oct. 2017, 4 pgs.

Eaton, "DURA-BLOK B-Line Series—A Complete Rooftop Support Solution", Jun. 2018, 8 pgs.

MIFAB C-Port, "C-Port Rubber Supports List Price Guide", 2012, 20 pgs.

PHP Systems/Designs, "Product Spotlight: Equipment & Solar Supports, Duct & Cable Trays" Product Flyer, downloaded Aug. 2019, known as of Oct. 2017, 4 pgs.

OMG Roofing products, "Pipe Supports and Flashings", www.omgroofing.com/pipe-supports.html?language=en, 2016, 1 pg.

PortalsPlus, "Pipe Mountings Pedestals", www.portalsplus.com, Oct. 2017, 1 pg.

Big Foot Systems, "Rooftop Building Services Support Systems" Catalog, Mar. 2018, 18 pgs.

Haydon, "H-Block Rooftop Support Systems" Catalog, Jan. 2016, 28 pgs.

U.S. Appl. No. 16/191,233, Office Action dated Oct. 22, 2019, 14 pages.

U.S. Appl. No. 16/191,233, Office Action dated Mar. 20, 2020, 12 pages.

U.S. Appl. No. 16/191,233, Notice of Allowance dated May 13, 2020, 11 pages.

* cited by examiner

PIPE SUPPORT AND METHOD

CROSS-REFERENCE TO RELATED APPLICATIONS

This application claims priority to and the benefit of U.S. Provisional Patent Application No. 62/587,293, filed on Nov. 16, 2017, under 35 U.S.C. § 119(e), the disclosure of which is hereby incorporated herein by reference in its entirety.

INTRODUCTION

Service piping may be installed in horizontal or substantially horizontal orientations along roofs, floors, and other indoor or outdoor surfaces. Such piping may include hot water (or steam) and chilled water piping for heating and cooling applications, respectively. Other service piping may include domestic hot water and cold water, storm drainage, or sewer piping. Additionally, specialty piping such as chemical and/or gas piping for industrial processes may be installed. Typically, all of these types of piping are installed above the surface along which they are routed to maintain required clearances, accommodate thermal expansion and contraction, and to increase visibility thereof to reduce potential damage. In another application, electrical wiring (within or outside of protective conduit) may be installed.

SUMMARY

In one aspect, the technology relates to a pipe support having: a pair of arms, wherein each arm of the pair of arms has a first end having an integral jaw component and a second end, and wherein a first arm of the pair of arms has a first tongue, and wherein a second arm of the pair of arms has a first elongate groove configured to slidably receive the first tongue; and a pair of base plates, wherein a first base plate of the pair of base plates is pivotably connected to the second end of the first arm, and wherein a second base plate of the pair of base plates is pivotably connected to the second end of the second arm. In an example, the second arm of the pair of arms has a second tongue, and wherein the first arm of the pair of arms has a second elongate groove configured to slidably receive the second tongue. In another example, the pipe support further including a positioning element for setting a position of the first arm relative to the second arm. In yet another example, the positioning element includes a worm drive. In still another example, the positioning element includes a pin.

In another example of the above aspect, the positioning element has a bolt and a nut configured to engage the bolt. In an example, the first tongue is elongate and has a radius of curvature substantially equal to a radius of curvature of the first elongate groove. In another example, the first elongate groove has a radius of curvature substantially equal to a radius of curvature of the second elongate groove.

In another aspect, the technology relates to a pipe support having: a first arm; a second arm; a joint having a tongue and a curved groove engaged with the tongue, wherein the joint slidably connects the first arm to the second arm; a first base plate pivotably connected to the first arm; and a second base plate pivotably connected to the second arm. In an example, the first arm and the second arm form a jaw for supporting a pipe, and wherein the joint is configured to slide between a first position and a second position, wherein a radius of curvature of the jaw is substantially the same in both the first position and the second position. In another example, the first arm has a surface defining a worm gear, and wherein the pipe support further includes a worm secured to the second arm and engaging the worm gear, wherein rotation of the worm adjusts an angle of the first arm relative to the second arm. In yet another example, the jaw has a single center axis about which the jaw is positionable. In still another example, the first base plate is pivotable about a first axis and the second base plate is pivotable about a second axis, wherein the first axis and the second axis are parallel.

In another example of the above aspect, the pipe support of claim 12, wherein the first base plate is pivotable about a first axis and the second base plate is pivotable about a second axis, wherein the first axis and second axis are parallel. In an example, the first axis and the second axis are substantially parallel to the center axis. In another example, the tongue is elongate and curved. In yet another example, each of the first arm and the second arm has both an elongate curved tongue and an elongate curved groove. In still another example, an elongate curved tongue on the first arm is configured to mate with an elongate curved groove of the second arm. In another example, an elongate curved tongue on the second arm is configured to mate with an elongate curved groove of the first arm.

In another aspect, the technology relates to a method of supporting a pipe with a pipe support having a pipe rest location having an adjustable-width opening and a base plate defining a datum plane, the method including: providing the pipe support; adjusting a width of the opening; and simultaneously with adjusting the width of the opening, adjusting a distance of the pipe rest location from the datum plane. In an example, the method further includes rotating an adjustment element, wherein rotating the adjustment element simultaneously adjusts the width of the opening and the distance of the pipe rest location from the datum plane.

BRIEF DESCRIPTION OF THE DRAWINGS

There are shown in the drawings examples that are presently preferred, it being understood, however, that the invention is not limited to the precise arrangements and configurations shown.

DETAILED DESCRIPTION

Figure 1:
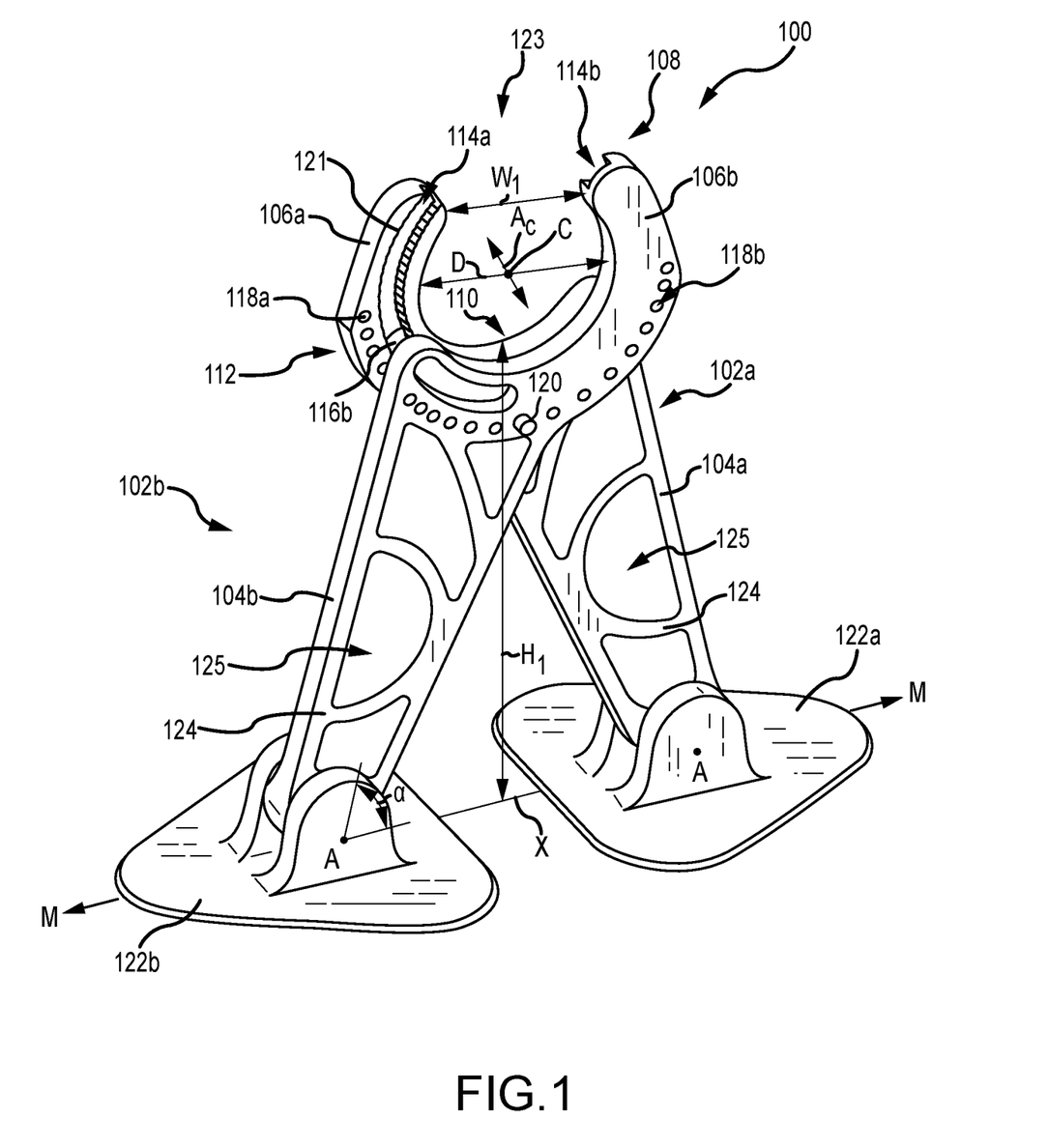
FIG. 1 is a perspective view of an exemplary pipe support in a first position.

As noted above, the devices described herein can be used to support various service piping (exposed, insulated, or otherwise encased), conduits, wiring, or other elongate structures. For clarity, however, the specification describes the devices in the context of piping support. FIG. 1 is a perspective view of an exemplary pipe support 100 in a first position. The pipe support 100 includes a pair of arms 102a, 102b, each having an elongate body 104a, 104b. At a first end of each arm 102a, 102b is an integral jaw component 106a, 106b. The two jaw components 106a, 106b form a jaw 108 that supports and may restrain a pipe (not shown). More specifically, the jaw 108 includes a pipe rest location 110 (generally the lowest point of the jaw 108 if the pipe support 100 is installed in the depicted vertical configuration). The arms 102a, 102b are slidably joined at a joint 112 that in the present example is a tongue-and-groove configuration. In the depicted pipe support 100, each arm 102a, 102b defines a groove 114a, 114b on facing sides thereof. Also on facing sides thereof are mating tongues 116b (tongue 116a is not visible in FIG. 1) that mate with a corresponding groove 114a. Thus, the joint 112 allows the arms 102a, 102b to rotate relative to each other to various positions, as described in more detail below. Although a joint 112 including two tongues and two grooves are depicted, other embodiments may include a single tongue and a single groove, or greater than two tongues and two grooves.

The pipe support 100 also includes a positioning element to set the position of the arms 102a, 102b relative to each other. In the depicted pipe support, the positioning element includes a plurality of holes or openings 118a, 118b defined by each jaw component 106a, 106b. A pin 120 may be inserted into aligned openings 118a, 118b on both jaw components 106a, 106b as required to set a position of the arms 102a, 102b (and, by extension, the jaw components 106a, 106b). In an alternative example, a nut and bolt may be utilized as a positioning element. The present example includes a plurality of serrations 121, e.g., along sides of the grooves 114a, 114b that may engage with corresponding structures on the tongues 116a, 116b to help set the position of the arms 102a, 102b. These serrations 121 do not necessarily set a position of the arms 102a, 102b, but may be used to control or resist rotation thereof.

Each arm 102a, 102b also includes a second end that may be pivotably connected to a base plate 122a, 122b that allows the pipe support 100 to rest on a flat or a substantially flat surface. Pivoting of the base plates 122a, 122b may occur about parallel axes A. Each base plate 122a, 122b may include one or more openings (not shown) that allow the pipe support 100 to be secured to the underlying structure with screws, bolts, or other fasteners. In other examples, an underside of each base plate 122a, 122b may be coated with an adhesive. The arms 102a, 102b may be formed of a solid construction, as depicted, with additional structural ribbing 124 to increase rigidity thereof. In other examples, areas 125 between structural ribbing 124 may define through holes through the bodies 104a, 104b.

FIG. 1 also depicts a number of structural relationships that may be used to describe certain functionalities of the pipe support 100. The structure of the pipe support 100 allows it to be easily adjusted so as to change the height and width of the pipe support 100. Thus, the pipe support 100 can be field-adjusted to support pipes installed at different heights above a support surface. Additionally, the pipe support 100 can also be field-adjusted to accommodate pipes of varying sizes (that is, up to a nominal pipe size, as specified by the diameter D of the jaw 108). More specifically, the base plates 122a, 122b define a datum plane X, above which the pipe rest location 110 may be disposed. In the depicted configuration, the pipe rest location 110 is disposed a height $H_1$ above the datum plane X. This height H1 may also be described as the pipe rest location 110 being disposed a first distance from the datum plane X. As the base plates 122a, 122b are moved M away from each other, the distance between the pipe rest location 110 and the datum plane X decreases. Conversely, moving the base plates 122a, 122b in an opposite direction from movement M increases the distance between the pipe rest location 110 and the datum plane X.

The depicted pipe support 100 can support pipes having an outer dimension up to a dimension defined by the diameter D of the jaw 108. This pipe dimension need not necessarily be the outer diameter of the pipe, but may also contemplate the outer dimension of any insulation, heat trace tape, metal or plastic shielding, or other components that may increase the effective outer dimension of the pipe. As an example, however, in the case of uninsulated pipes a pipe support 100 having a diameter D of, e.g., two inches, may support pipes up to and including two inch diameter pipes. In the example depicted in FIG. 1, the jaw 108 is also defined by a jaw opening 123 having a width $W_1$. Depending on the distance separating the base plates 122a, 122b, the width $W_1$ may be less than the diameter D.

Thus, returning to the case of an uninsulated pipe two inch pipe, the jaw opening 123 may have to be adjusted so as to receive the pipe within the jaw 108. The jaw opening 123 is opened by moving M the base plates 122a, 122b away from each other. For example, if the pipe is two inches, and the diameter D is a nominal two inches, the jaw 108 would have to be opened such that the width $W_1$ is substantially equal to the diameter D, so as to allow insertion of the pipe through the jaw opening 123. Pipes having a dimension less than the width $W_1$ may not require adjustment to fit through the jaw opening 123. Further, as the base plates 122a, 122b are moved M farther apart, the angle α of the arms 102a, 102b relative to the base plates 122a, 122b decreases.

FIG. 1 also depicts a jaw center point C, about which the jaw components 106a, 106b rotate as the base plates 122a, 122b are moved M apart. This center point C may be located on an axis $A_C$ that is substantially parallel to or aligned with a pipe resting on pipe rest location 110.

Figure 2:
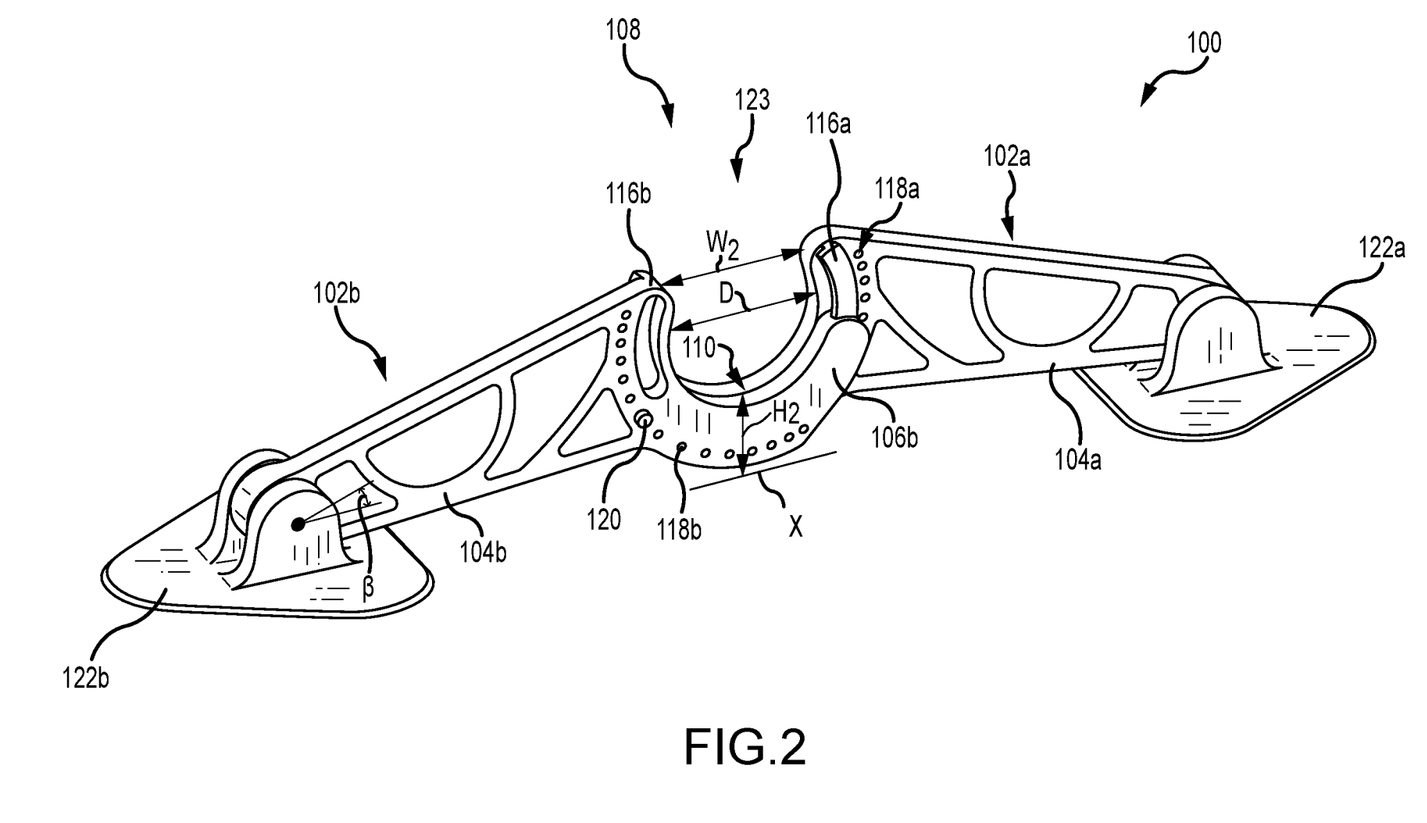
FIG. 2 is a perspective view of the pipe support of FIG. 1 in a second position.

FIG. 2 is a perspective view of the pipe support 100 of FIG. 1 in a second position. A number of elements of the pipe support 100 are described above with regard to FIG. 1 and, as such, are not necessarily described further. This second position may be a lower-most position, where the tongues 116a, 116b are still engaged with their respective grooves (not shown). In this lower-most position, the distance $H_2$ from the pipe rest location 110 to the datum plane X is less than the distance $H_1$ in FIG. 1. As such, the angle β is less than the angle α of FIG. 1. The tongue and groove joint structure of the depicted pipe support 100 is such that the diameter D of the jaw 108 remains the same as the position of the arms 102a, 102b is changed. The width W2 of the jaw opening 123 is wider than width $W_1$ depicted in FIG. 1. As such, in the position where the base plates 122a, 122b are farther apart, the jaw opening may more easily accommodate pipes having dimensions closer to that of the diameter D.

Figure 3:
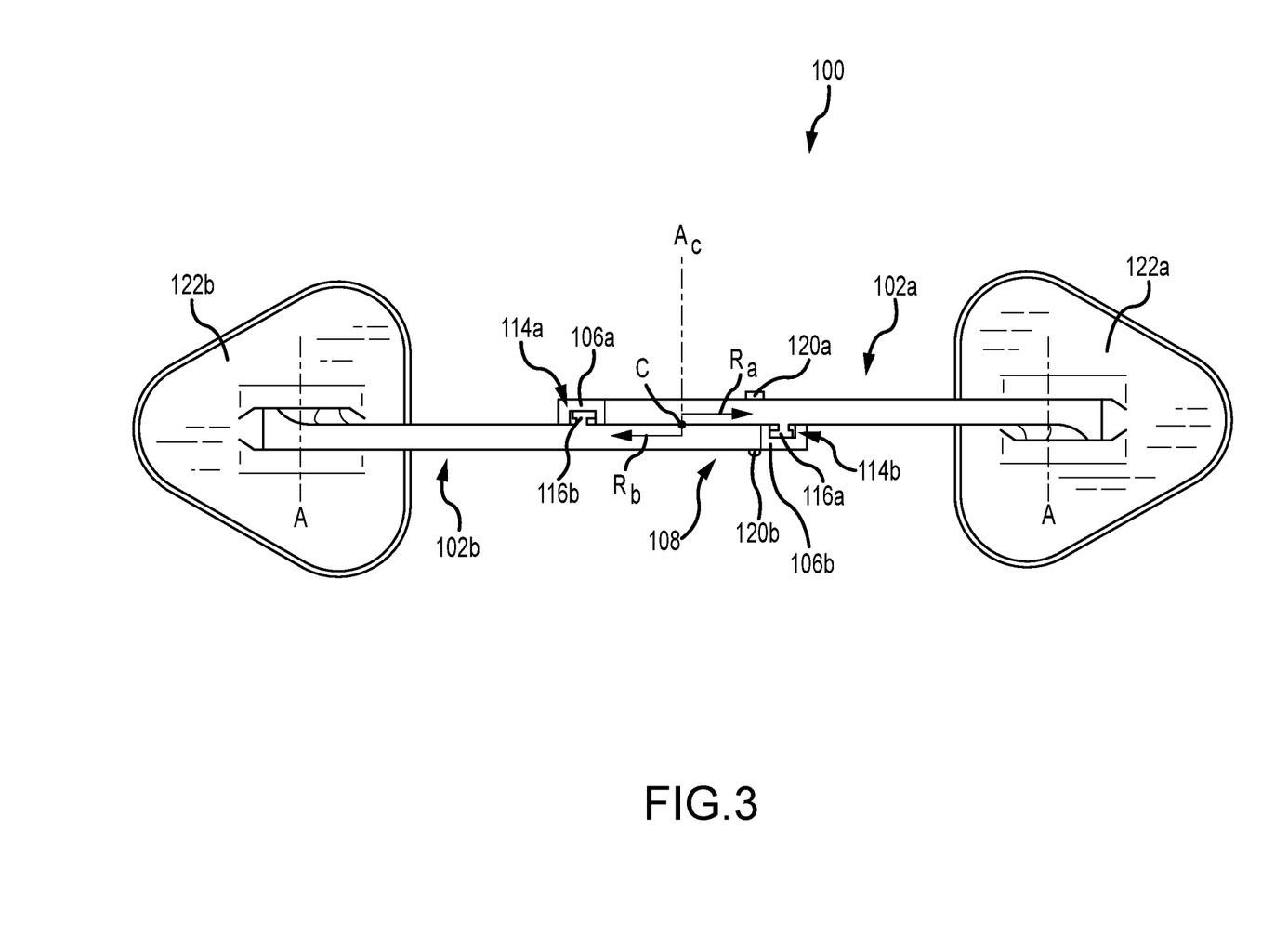
FIG. 3 is a top view of the pipe support of FIG. 1.

FIG. 3 is a top view of the pipe support 100 of FIG. 1. A number of elements of the pipe support 100 are described above with regard to FIG. 1 and, as such, are not necessarily described further. The pipe support 100 includes two arms 102a, 102b. Each arm 102a, 102b defines, at the jaw components 106a, 106b, the groove 114a, 114b configured to receive the corresponding tongue 116b, 116a that extends from the opposite arm 102b, 102a. As can be seen, there are two mating joints, each utilizing a tongue and groove. More specifically, a first joint includes tongue 116a and groove 114b, while a second joint includes tongue 116b and groove 114a. The radius between each of these joints and the center C of the jaw 108 may be defined as Ra and Rb. Notably, these radii Ra and Rb (as measured to an approximate centerline of a corresponding tongue or groove) are substantially equal, which allows the jaw 108 to maintain a constant diameter D (shown in FIGS. 1 and 2) regardless of the position of the arms 102a, 102b relative to each other. A pin having a head 120a and a tip 120b may extend completely through both arms 102a, 102b so as to fix a position of those elements relative to each other. FIG. 3 also depicts the substantially parallel orientation of axes A, $A_C$.

Figure 4A:
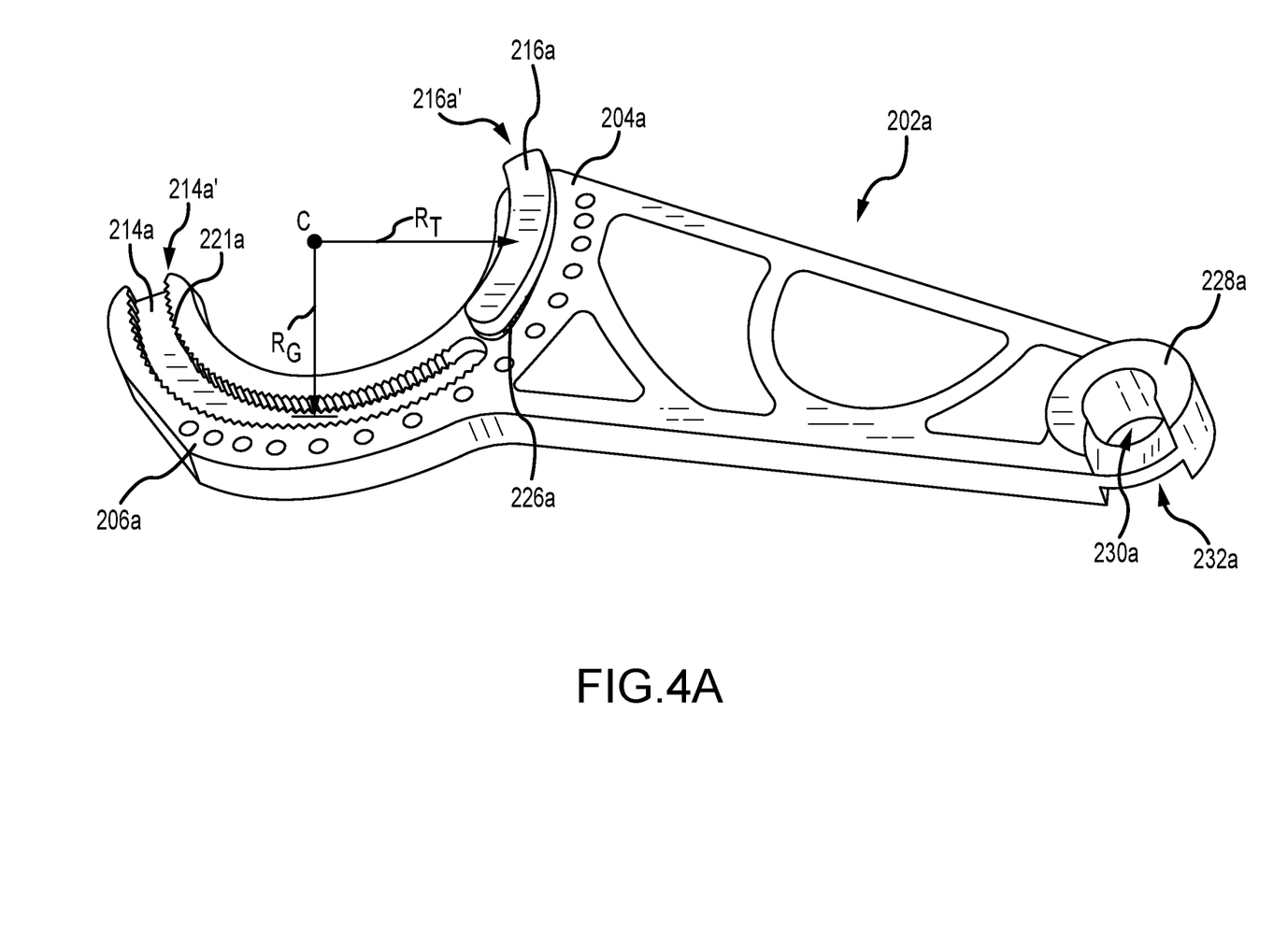
FIG. 4A is a front perspective view of an arm of a pipe support.
Figure 4B:
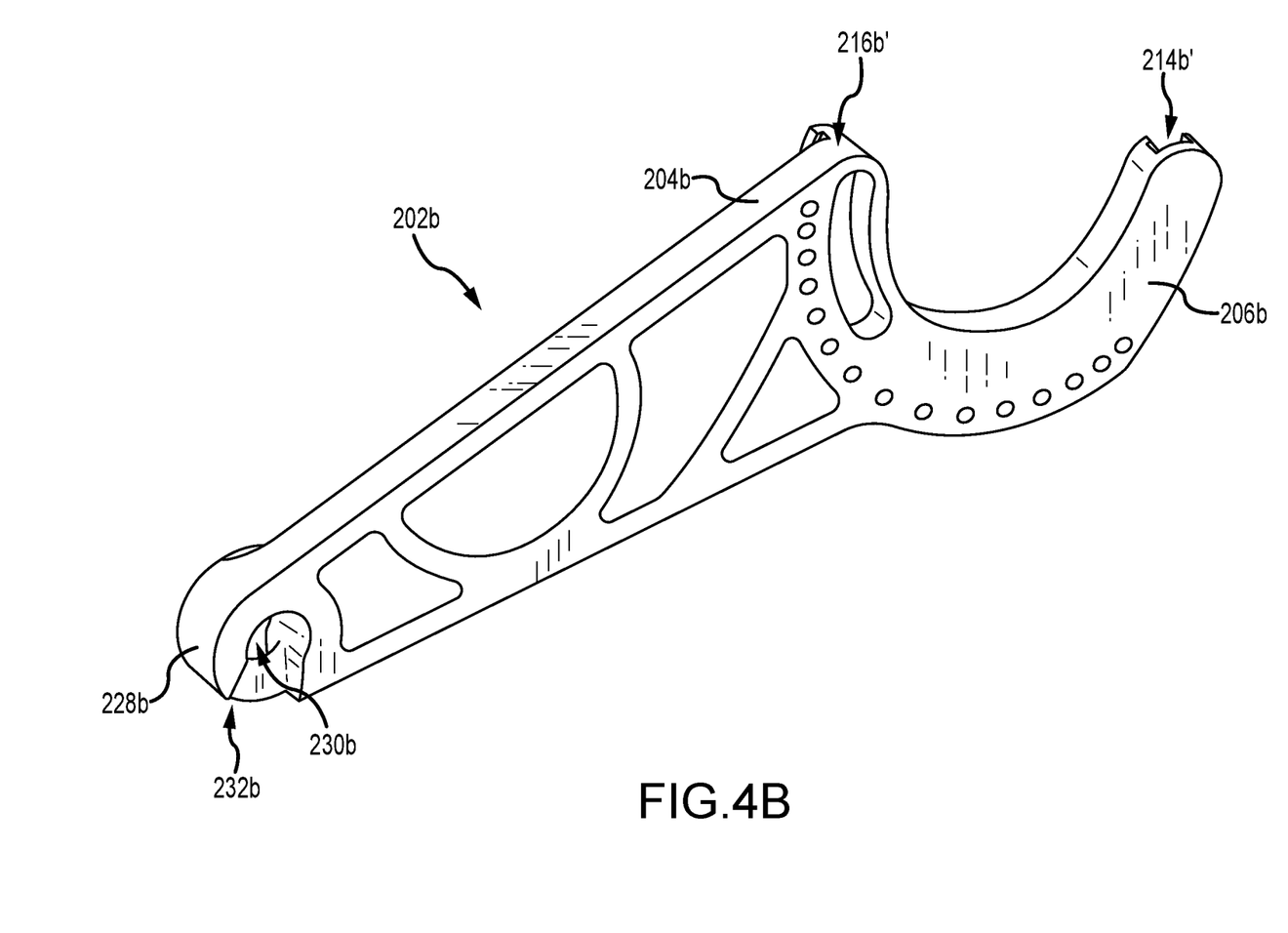
FIG. 4B is a rear perspective view of an arm configured to oppose the arm of FIG. 4A.

FIG. 4A is a rear perspective view of an arm 202a of a pipe support, while FIG. 4B is a front perspective view of an opposing arm 202b. The arm 202a of FIG. 4A is generally described first, though the features described may also be present on the arm 202b (and are depicted in FIG. 4B as having the suffix "b"). Identical features on the two arms 202a, 202b allow for improved mating thereof. The arm 202a includes a body 204a that may be tapered from a first end to a second end. In another example, the body 204a may be of even dimensions along its length. The first end may define a jaw component 206a having a substantially curved shape. The jaw component 206a at least partially defines a groove 214a having a radius of curvature $R_G$ (e.g., from the jaw center C to a centerline of the groove 214a). A tongue 216a may project from the arm 202a and may also be elongate and, if so, may have a radius of curvature $R_T$ (e.g., from the jaw center C to a centerline of the tongue 216a). In other examples, the tongue need not be elongate, but may be shaped so as to fit within and slide relative to the groove 214a. Although not required, it may be desirable that the tongue 216a and groove 214a may have surfaces that mate so as to prevent disconnection thereof. In that regard, a portion of the tongue 216a may be enlarged relative to another portion of the tongue 216a (e.g., a base of the tongue 216a may be narrower than a top thereof). The groove 214a may be similarly shaped so as to capture the enlarged portion of the tongue 216a, thus preventing disconnection of the joint during normal use.

The tongue 216a depicted in FIG. 4A includes a leading end 216a', while the groove 214a includes a leading opening 214a'. A corresponding leading end 216b' and a corresponding leading opening 214b' are depicted in FIG. 4B. Connection of the pair of arms 202a, 202b is described in the context of FIGS. 4A and 4B. The leading end 216a' is aligned with the leading opening 214b' substantially simultaneously with the leading end 216b' being aligned with the leading opening 214a'. The arms 202a, 202b are then rotated relative to each other about the jaw center C, so as to engage the two tongue and groove joints. Serrations 221a on the groove 214a may engage with corresponding serrations on the mating tongue. In the depicted figures, mating serrations on tongue 216b are not visible, but similar serrations 226a are depicted on tongue 216a. The serrations may help control rotation of the arms 202a, 202b relative to each other, but are generally not used to fix a position of the arms 202a, 202b.

Both arms 202a, 202b may further include an enlarged hub 228a, 228b at a second end of each arm 202a, 202b. The hubs 228a, 228b allow for engagement with corresponding base plates, as depicted elsewhere herein. Each hub 228a, 228b may include a through hole 230a, 230b as depicted or may be solid. In the depicted configuration, the hubs 228a, 228b also include a recess 232a, 232b that aids in mating with the base plates, as described in more detail below.

Figure 5:
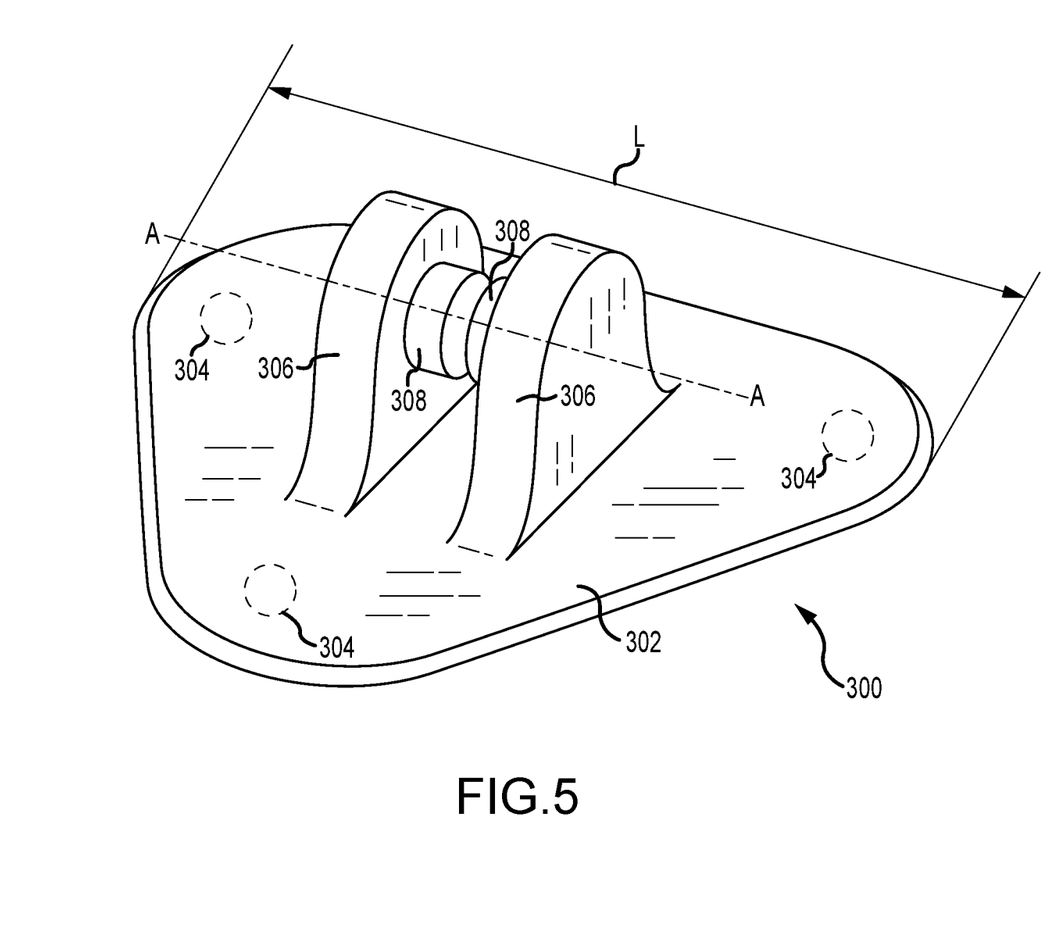
FIG. 5 is a perspective view of a base plate of a pipe support.

FIG. 5 is a perspective view of a base plate 300 of a pipe support. The base plate 300 includes a generally flat body 302 that provides stability for the pipe support when placed. Although the pipe support need not be secured to an underlying surface upon which the base plate 300 rests, the body 302 may define one or more openings 304 that may receive bolts, screws, or other fasteners. The depicted base plate 300 includes two struts 306 extending upward from the body 302. One or more axles 308 extend between the struts 306. In this configuration, the axles 308 are aligned and configured to mate with the hub of the associated arm, as described above. By having a pair of axles 308, as depicted in FIG. 5, the associated arm hub may be press-fit onto the axles 308 (at the recess 232 shown in FIGS. 4A and 4B) which causes the struts 306 to spread to capture the hub at the axles 308.

The axles 308 define the axes A that, when the base plates 300 are connected to associated arms of a pipe support, are parallel to each other. As noted above, the axes A are substantially parallel to the axis $A_C$ passing through the center C of the jaw (as depicted in FIGS. 1-3). As such, the base plates 300 are configured to resist loads applied to the pipe support that are substantially skew or orthogonal to the axes A. The pipe support is potentially less resistant to loads that are substantially parallel to the axes A. As such, the base plate body 302 includes a length L that is measured substantially parallel to the axis A. A longer length L may help resist tipping or leaning of the pipe support when the support is subjected to loads parallel to axes A. Longer lengths L can more strongly resist leaning or tipping, and can also provide a greater surface area in which to define openings 304 to receive additional fasteners.

Figure 6:
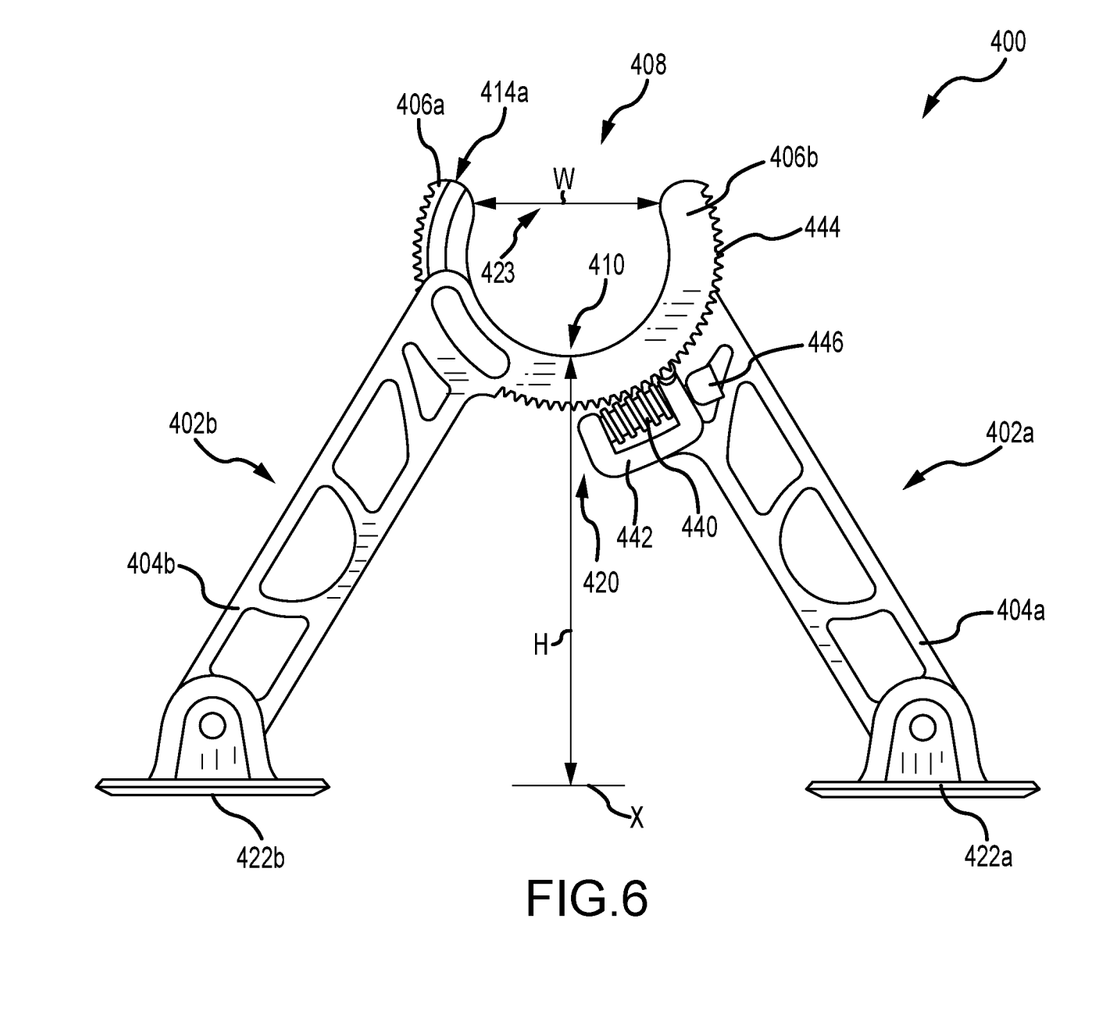
FIG. 6 is a side view of another example of a pipe support in a first position.

FIG. 6 is a side view of another example of a pipe support 400 in a first position. The pipe support 400 includes two arms 402a, 402b having a non-tapered configuration of a body 404a, 404b. Lower ends of the arms 402a, 402b are pivotably connected to base plates 422a, 422b, e.g., with the features described elsewhere herein. Disposed at opposite ends of the arms 402a, 402b are jaw components 406a, 406b that form a jaw 408 adjustable via a tongue and groove 414a joint. The depicted pipe support 400 includes a positioning element 420, in this case, a worm drive. The worm drive 420 includes a worm 440 rotatably supported on a brace 442 extending from one of the arms, in this case, arm 402a. The worm 440 is engages with a worm gear 444 formed along an outer curvature of the jaw component 406b. Rotation of an actuator 446 (e.g., with a screwdriver or other implement, or by hand) rotates the worm 440, which adjusts a position of the worm gear 444. Thus, rotation of the actuator 446 adjusts a position of the arms 402a, 402b relative to each other, which simultaneously adjusts a height H of a pipe rest location 410 above the datum plane X, as well as adjusts a width W of a jaw opening 423. The worm drive 420 prevents inadvertent slippage or movement of the pipe support 400 (e.g., due to a weight of the pipe) once the position of the pipe support 400 is set.

Figure 7:
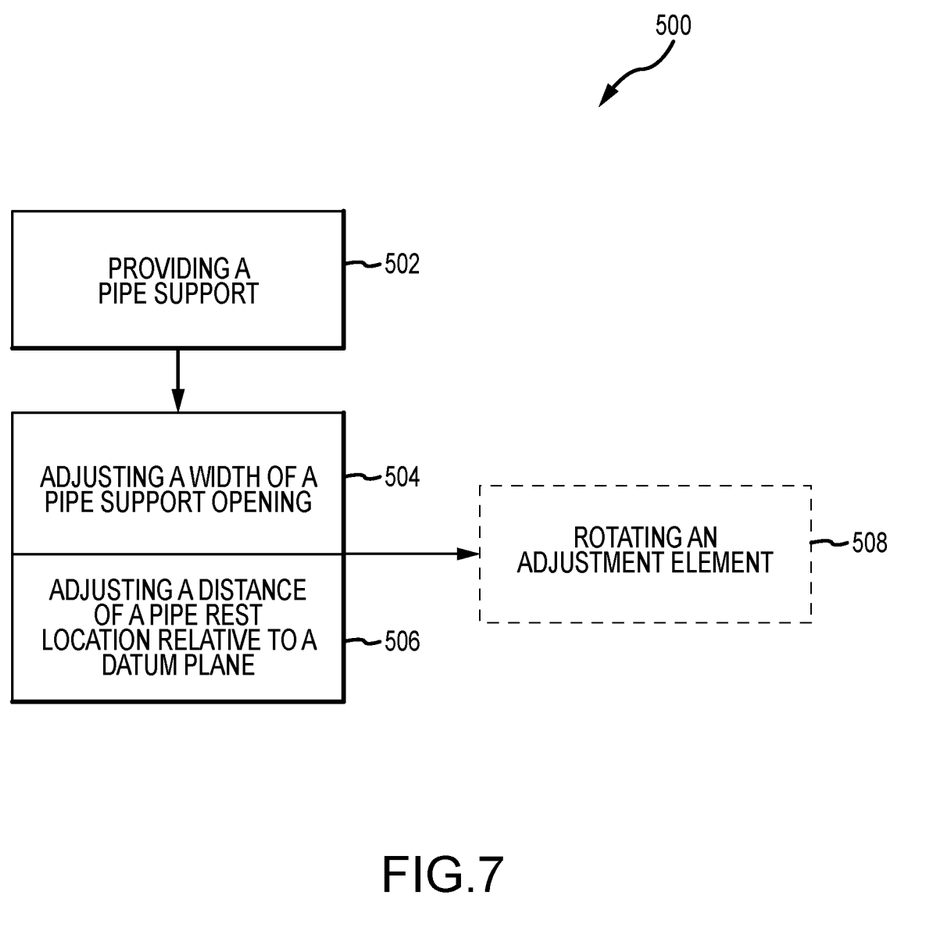
FIG. 7 is a method of supporting a pipe with a pipe support.

FIG. 7 is a method 500 of supporting a pipe with a pipe support. The pipe support may include a location on which the pipe being supported rests, as well as a base plate that defines a datum plane. Examples of such pipe supports are described herein. A pipe support is provided in operation 502. In operation 504, a width of the pipe support opening is adjusted. In examples, operation 504 may be performed substantially simultaneously with operation 506, wherein a distance of a pipe rest location relative to a datum plane is adjusted. In examples, operations 504 and 506 may be performed simultaneously by rotating an adjustment element on the pipe support, operation 508.

Figure 8A:
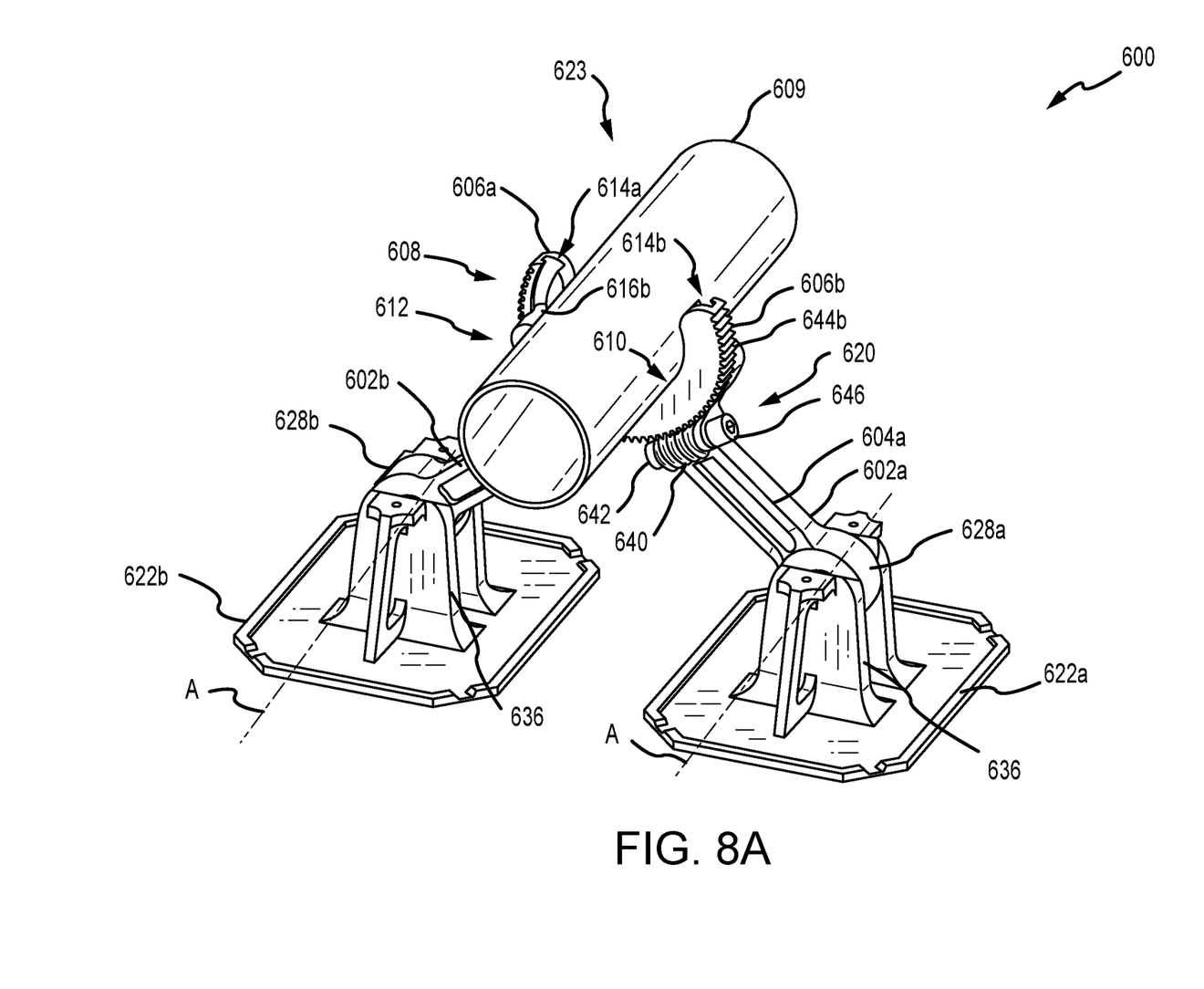
FIG. 8A is a perspective view of another example of a pipe support in a first position.
Figure 8B:
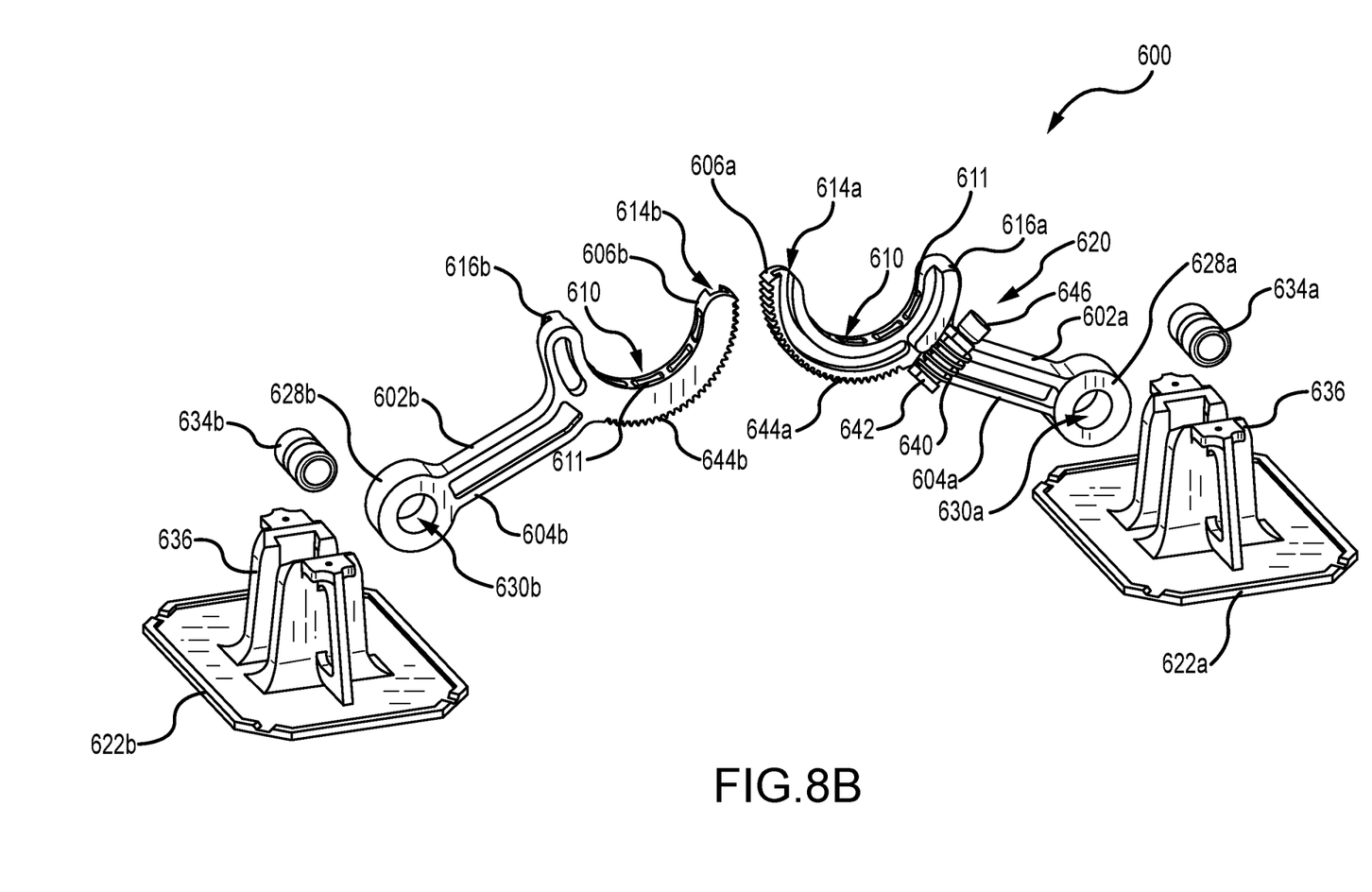
FIG. 8B is an exploded perspective view of the pipe support of FIG. 8A.

FIG. 8A is a perspective view of another example of a pipe support 600 in a first position. FIG. 8B is an exploded perspective view of the pipe support 600. Referring concurrently to FIGS. 8A and 8B, the pipe support 600 includes a pair of arms 602*a*, 602*b*, each having a non-tapered elongate body 604*a*, 604*b*. At a first end of each arm 602*a*, 602*b* is an integral jaw component 606*a*, 606*b*. The two jaw components 606*a*, 606*b* form an adjustable jaw 608 that supports and may restrain a pipe 609 (shown in FIG. 8A). The jaw 608 includes a pipe rest location 610 that is formed on an inside surface of each jaw component 606*a*, 606*b*. In this example, the pipe rest location 610 may include one or more rollers 611 (shown in FIG. 8B). The rollers 611 enable the pipe 609 to be axially moveable (e.g., due to thermal expansion) so that stress induced on the pipe 609 from the pipe support 600 is decreased. The rollers 611 are described further below in reference to FIG. 9.

The arms 602*a*, 602*b* are slidably joined at a joint 612 that is a tongue-and-groove configuration. For example, each arm 602*a*, 602*b* defines a groove 614*a*, 614*b* on facing sides thereof. Also on facing side thereof, are mating tongues 616*a*, 616*b* that releasably mate with the corresponding groove 614*a*, 614*b* on the opposite arm. The pipe support 600 also includes a positioning element 620 that is a worm drive. The positioning element 620 includes a worm 640 rotatably supported on one of the arms 602*a*, 602*b* by a brace 642 extending therefrom. The worm 640 engages with a worm gear 644*a*, 644*a* formed along an outer curvature of the jaw components 606*a*, 606*b* disposed on the opposite arm. In the example, both arms 602*a*, 602*b* are the same shape, and therefore, both have the worm gear 644*a*, 644*b*. However, only one arm (here arm 602*a*) includes the positioning element 620, and thus, only one worm gear 644*b* is engaged. By forming both arms 602*a*, 602*b* in the same shape, manufacturing efficiencies are increased. To adjust the position of the arms 602*a*, 602*b* relative to one another, an actuator 646 is rotated (e.g., with a screwdriver, an allen wrench, or other implement, or by hand) to drive rotation of the worm 640 and move the worm gear 644*b*. The movement of the arm 602*a*, 602*b* relative to each other simultaneously adjusts the height of the pipe rest location 610, as well as adjusts a width of a jaw opening 623.

Each arm 602*a*, 602*b* also includes a second end that may be pivotably connected to a base plate 622*a*, 622*b* that allow the pipe support 600 to rest on a flat or a substantially flat surface. Pivoting of the arms 602*a*, 602*b* relative to the base plates 622*a*, 622*b* may occur about parallel axes A. Each arm 602*a*, 602*b* includes an enlarged hub 628*a*, 628*b* at the second end. The hubs 628*a*, 628*b* allow for pivotable engagement with the corresponding base plate 622*a*, 622*b*. Each hub 628*a*, 628*b* may include a through hole 630*a*, 630*b* sized and shaped to receive an axle 634*a*, 634*b* (shown in FIG. 8B) that couples to the base plate 622*a*, 622*b* and supports the arms 602*a*, 602*b* therein. In the example, each base plate 622*a*, 622*b* is substantially rectangular in shape and includes two struts 636 extending upward. In operation the axles 634*a*, 634*b* extend between the struts 636 and are configured to mate with the hub 628*a*, 628*b* of the associated arm 602*a*, 602*b*. The axles 634*a*, 634*b* defines the axes A upon which the arms 602*a*, 602*b* pivot about. The base plate 622*a*, 622*b* and axles 634*a*, 634*b* are described further below in reference to FIG. 10.

Figure 9:
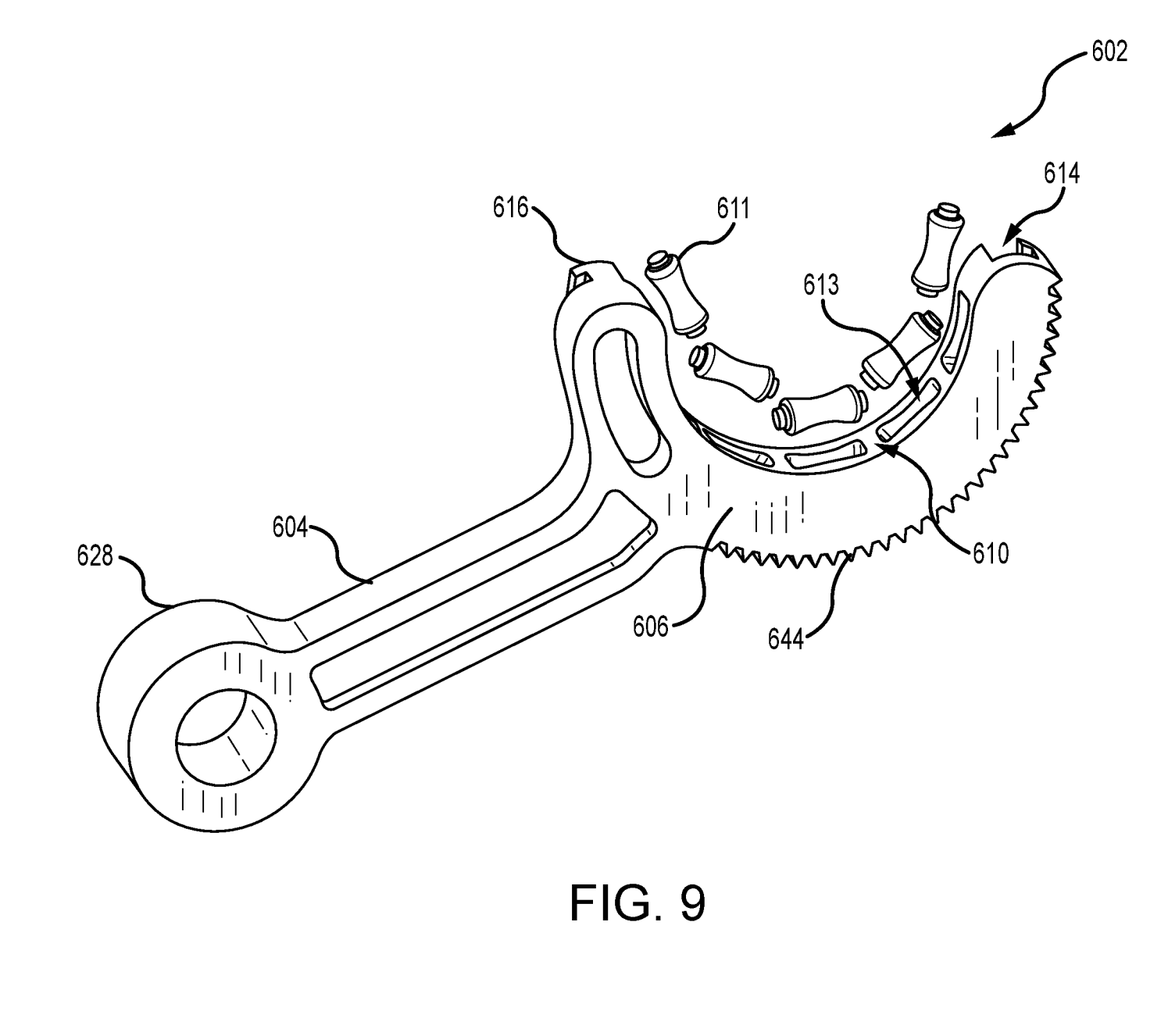
FIG. 9 is an exploded perspective view of an arm of the pipe support of FIG. 8A.

FIG. 9 is an exploded perspective view of the arm 602 of the pipe support 600 (shown in FIGS. 8A and 8B). As described above, the arm 602 includes the elongate body 604 with the jaw component 606 formed on a first end and the hub 628 form on the opposite second end. The jaw component 606 includes the pipe rest location 610 and one or more rollers 611. The pipe rest location 610 is formed on an inside surface of the jaw component 606 opposite of the worm gear 644 and adjacent to the groove 614 and the tongue 616 features that are formed on a side surface of the jaw component 606. Additionally, the pipe rest location 610 extends circumferentially around the center C of the jaw (shown in FIG. 1) and includes one or more cavities 613 that are sized and shaped to at least partially receive a corresponding roller 611 therein. The cavities 613 are circumferentially spaced within the pipe rest location 610.

In the example, the rollers 611 have a substantially cylindrical hour-glass shape with projecting ends that form an axle for the rollers 611 to rotate. The rollers 611 may be press-fit within the cavities 613 so that they are secured therein, and also, are enabled to rotate therein. Additionally, at least a portion of the rollers 611 extend above the pipe rest location 610 so that at least a portion of the pipe 609 (shown in FIG. 8A) is supported directly by the roller 611. The rollers 611 enable the pipe 609 to be axially moveable (e.g., due to thermal expansion) so that stress induced on the pipe 609 from the pipe support 600 is decreased. In the example, five rollers 611 are spaced within the pipe rest location 610. It is appreciated that any other number of rollers 611 (e.g., a greater number or a lesser number) may be used as required or desired. The rollers 611 are segmented around the pipe rest location 610 so that they do not undesirable reduce the diameter D of the jaw (shown in FIG. 1) when the pipe support 600 is assembled together.

Figure 10:
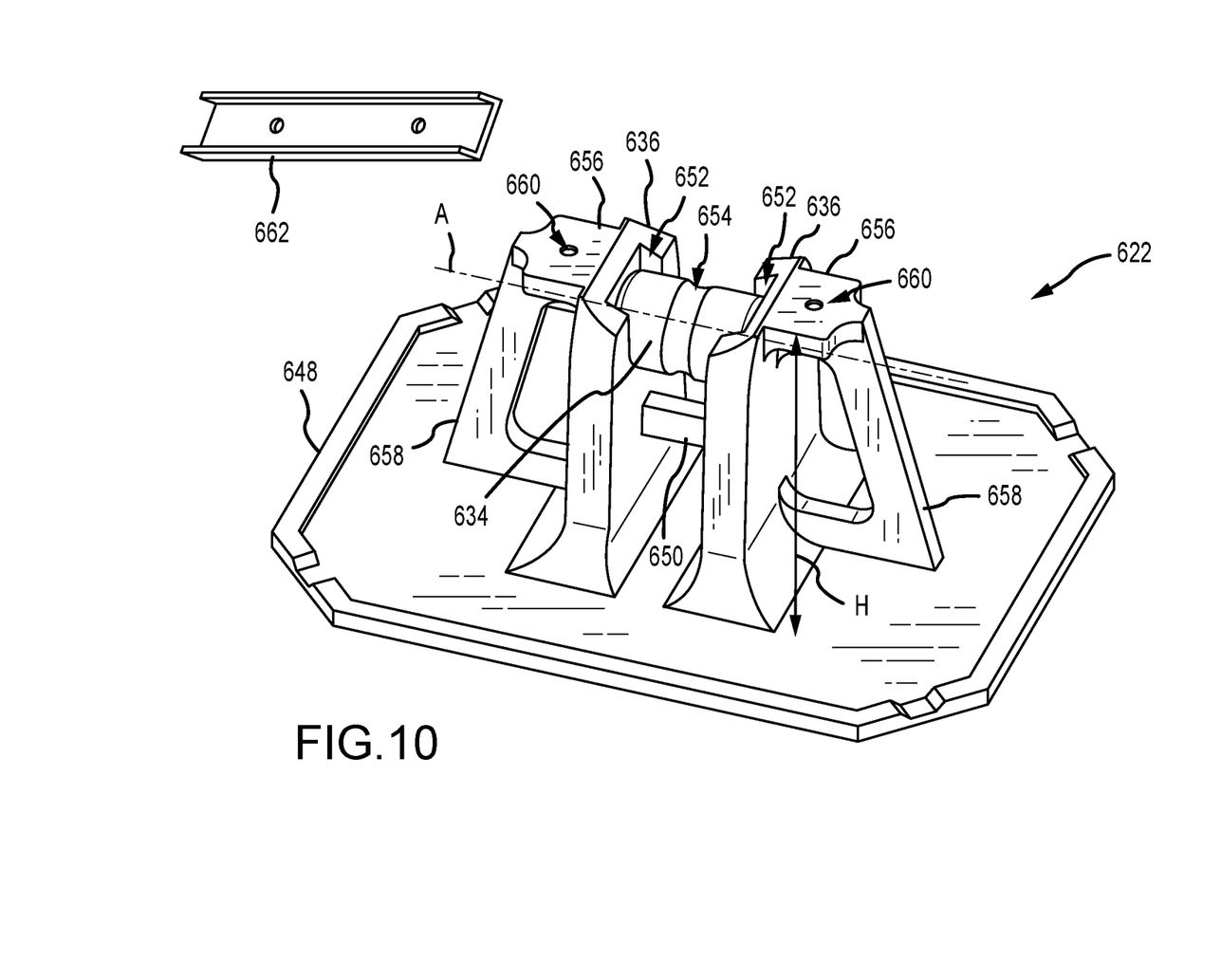
FIG. 10 is a perspective view of a base plate of the pipe support of FIG. 8A.

FIG. 10 is a perspective view of the base plate 622 of the pipe support 600 (shown in FIGS. 8A and 8B). As described above, the base plate 622 includes two struts 636 extending therefrom and utilized to support the arm 602 (shown in FIG. 9). The base plate 622 includes a generally flat and substantially rectangular shaped body 648 that provides stability for the arm and pipe support. Two struts 636 extend upward from the body 648, and generally, are positioned proximate the center of the body 648. The two struts 636 are spaced apart from one another, and in some examples, have a support bar 650 extending therebetween. Each strut 636 is rectangular in shape with its long edge extending from the body 648. At the free end of each strut 636, a recess 652 is formed and sized and shaped to receive the axle 634, and allow the axle 634 to rotate therein about axis A. The axle 634 extends between the struts 636 and is configured to mate with the hub 628 (shown in FIG. 9) of the associated arm 602.

As described above, the base plate 622 enables support of the arm 602 so that it may pivot relative to the base plate 622 and about axis A. Additionally or alternatively, the base plate 622 can be used without the arm 602 and provide a fixed height H pipe support. In the example, the fixed height H of the struts 636 may provide approximately a 3 inch high fixed pipe support. In other examples, the height H may be greater than or less than 3 inches as required or desired. As such, in this example, the pipe support system provides a versatile system in which the base plate 622 can be used to support an adjustable height pipe support 600, and also, be used individually as a fixed height pipe support as required or desired.

In one fixed height configuration, the base plate 622 may receive the axle 634 without the arm 602 and as illustrated in FIG. 10. In this configuration, the pipe may be supported on the axle 634 and form a roller support. The axle 634 may be a substantially hollow cylindrical body with an annular groove 654 defined therein. The annular groove 654 is sized and shaped to receive up to a 4 inch diameter pipe and facilitates positioning the pipe in the center of the pipe support system. Additionally, to either side of the annular groove 654, the axle 634 has a flat roller surface to facilitate roller support of square shaped pipes. The axle 634 is freely rotatable within the recesses 652. Additionally, the free ends of the struts 636 may have an inward taper so as to enable larger pipes to be supported on the axle 634. In other example, the axle 634 may be a substantially solid cylindrical body so as to increase the mass of the roller support. In another example, the axle 634 may include an outer surface devoid of any grooves to enable an entirely flat roller surface. In another example, the axle 634 may have a substantially hollow or solid hour-glass shape so as to facilitate supporting the round pipe. In still another example, the axle 634 may have any other shape that enables function of the system as described herein.

Additionally, in the example, the base plate 622 includes flats 656 extending from the top of each strut 636 and away from the recesses 652. The flats 656 are supported by a structural support 658 that extends down to the body 648. The flats 656 include one or more apertures 660 that are defined therein. In another fixed height configuration of the base plate 622, the flats 656 provide a raised support to secure a channel 662 thereto, via a screw, strap, bolt, or the like. The channel 662 is configured to support and secure any number of components including pipes. Additionally, two or more base plates 622 may be used to support a longer channel member.

The materials utilized in the pipe supports described herein may be those typically utilized for building hardware component manufacture. Material selection for most of the components may be based on the proposed weight of the pipe, installation conditions, safety guidelines, etc. Appropriate materials may be selected for the pipe supports used on particularly heavy or large pipes, as well as on pipes subject to certain environmental conditions (e.g., moisture, corrosive atmospheres, UV exposure, etc.). Aluminum, steel, stainless steel, zinc, or composite materials can be utilized. Injection molded plastics may be particularly useful.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A pipe support comprising:
a pair of arms, wherein each arm of the pair of arms comprises a first end comprising an integral jaw component and a second end, wherein the integral jaw component has a pipe rest surface that at least partially extends circumferentially around a center point, wherein a first arm of the pair of arms comprises a first tongue, wherein a second arm of the pair of arms comprises an first elongate groove configured to slidably receive the first tongue, wherein the first tongue is elongate and comprises a first radius of curvature relative to the center point and the first elongate groove comprises a second radius of curvature relative to the center point, and wherein the first radius of curvature is substantially equal to the second radius of curvature, and both of the radius of curvatures are greater than a radius of curvature of the pipe rest surface; and
a pair of base plates, wherein a first base plate of the pair of base plates is pivotably connected to the second end of the first arm, and wherein a second base plate of the pair of base plates is pivotably connected to the second end of the second arm.

2. The pipe support of claim 1, wherein the second arm of the pair of arms comprises a second tongue, and wherein the first arm of the pair of arms comprises a second elongate groove configured to slidably receive the second tongue.

3. The pipe support of claim 1, further comprising a positioning element for setting a position of the first arm relative to the second arm.

4. The pipe support of claim 3, wherein the positioning element comprises a worm drive.

5. The pipe support of claim 3, wherein the positioning element comprises a pin.

6. The pipe support of claim 3, wherein the positioning element comprises a bolt and a nut configured to engage the bolt.

7. The pipe support of claim 2, wherein the first elongate groove comprises a radius of curvature substantially equal to a radius of curvature of the second elongate groove.

8. A pipe support comprising:
a first arm;
a second arm, wherein the first arm and the second arm form a jaw for supporting a pipe;
a pipe rest surface defined on the jaw that at least partially extends circumferentially around a center point,
a joint comprising a tongue and a curved groove engaged with the tongue, wherein the joint slidably connects the first arm to the second arm, wherein the joint is configured to slide between a first position and a second position about the center point, wherein a diameter of the jaw relative to the center point is substantially the same in both the first position and the second position;
a first base plate pivotably connected to the first arm; and
a second base plate pivotably connected to the second arm.

9. The pipe support of claim 8, wherein the first arm comprises a surface defining a worm gear, and wherein the pipe support further comprises a worm secured to the second arm and engaging the worm gear, wherein rotation of the worm adjusts an angle of the first arm relative to the second arm.

10. The pipe support of claim 8, wherein the jaw has a single center axis about which the jaw is positionable.

11. The pipe support of claim 10, wherein the first base plate is pivotable about a first axis and the second base plate is pivotable about a second axis, wherein the first axis and the second axis are parallel.

12. The pipe support of claim 11, wherein the first axis and the second axis are substantially parallel to the center axis.

13. The pipe support of claim 8, wherein the tongue is elongate and curved.

14. The pipe support of claim 13, wherein each of the first arm and the second arm comprise both an elongate curved tongue and an elongate curved groove.

15. The pipe support of claim 14, wherein an elongate curved tongue on the first arm is configured to mate with an elongate curved groove of the second arm.

16. The pipe support of claim 15, wherein an elongate curved tongue on the second arm is configured to mate with an elongate curved groove of the first arm.

17. The pipe support of claim 8, wherein the first base plate is coupled to the first arm via a first axle and the second base plate is coupled to the second arm via a second axle, and wherein the first axle and the second axle each comprise an annular groove shaped and sized to receive at least a portion of a pipe.

18. The pipe support of claim 1, wherein the pipe rest surface comprises one or more rollers.

* * * * *